(12) United States Patent
Dillon

(10) Patent No.: US 12,057,967 B2
(45) Date of Patent: *Aug. 6, 2024

(54) VPN CLASSIFICATION TO REDUCE USAGE COSTS WHILE RETAINING RESPONSIVENESS

(71) Applicant: Hughes Network Systems, LLC, Germantown, MD (US)

(72) Inventor: Douglas Merrill Dillon, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,352

(22) Filed: Aug. 11, 2023

(65) Prior Publication Data

US 2023/0388151 A1 Nov. 30, 2023

Related U.S. Application Data

(63) Continuation of application No. 17/217,194, filed on Mar. 30, 2021, now Pat. No. 11,777,760.

(60) Provisional application No. 63/132,254, filed on Dec. 30, 2020.

(51) Int. Cl.
*H04L 12/46* (2006.01)

(52) U.S. Cl.
CPC ...... *H04L 12/4633* (2013.01); *H04L 12/4641* (2013.01)

(58) Field of Classification Search
CPC .............. H04L 12/4633; H04L 12/4641
See application file for complete search history.

*Primary Examiner* — Blake J Rubin
(74) *Attorney, Agent, or Firm* — NovoTechIP International PLLC

(57) ABSTRACT

Systems and methods for estimating the kind of traffic a VPN is carrying and determining which WAN connection to use for VPN network traffic to reduce usage costs while maintaining responsiveness in a VPN router or gateway. A VPN classifier examines VPN packets and estimates the type of traffic they are carrying and selects a policy for upstream or downstream traffic to determine which tunnel or tunnels to send network traffic. Further, policies may be applied to VPN packets as a function of usage knob.

20 Claims, 10 Drawing Sheets

VPN CLASSIFICATION TO REDUCE USAGE COSTS WHILE RETAINING RESPONSIVENESS

CROSS REFERENCE TO RELATED APPLICATION

This application is a continuation of U.S. patent application Ser. No. 17/217,194, filed Mar. 30, 2021, and titled VPN Classification To Reduce Usage Costs While Retaining Responsiveness," which claims the benefit of priority from U.S. Provisional Patent Application Ser. No. 63/132,254, filed Dec. 30, 2020, and titled "VPN Classification To Reduce Usage Costs While Retaining Responsiveness," which are incorporated by reference herein in their entirety.

BACKGROUND

Wireless internet broadband services, such as those provided by geosynchronous satellite, sometimes referred to as High-Thruput-Satellite or HTS, and cellular telephony services (here-in-after referred to as LTE) differ from wired broadband Internet access in that the capacity of a wireless network is typically much less than that of a wired broadband network. The result is that the amount of usage (measured in units of, perhaps, gigabytes (GB)/month) cost-effectively available to a user is less than the usage a user would consume were capacity limits not a concern. An example of this is a cell phone service plan with a limit of 4 GB/month while a cable modem service might have a limit which is 1000 times larger.

Metered internet access is internet access where the cost to the user depends on the amount of data transferred. Additionally, in metered internet access, performance to the end-user may also be reduced by the service provider as usage exceeds various thresholds. Metered internet access is the pre-dominant form of service offered by HTS and LTE Internet Service Providers (ISPs) to consumers.

A Virtual Private Network (VPN) is a tool that is often used to support a home-office worker securely accessing the worker's enterprise corporate network. Such a VPN carries a variety of applications including voice-calls, video-conference point-to-point calls and meetings with document sharing, email, web page access, centralized file storage, etc. The VPN's packets are encrypted such that a packet's content cannot directly identify the IP flow the packet is part of within the VPN or what application the IP flow is carrying.

Software Defined Wide Area Network (SD-WAN) is a network that allows software defined policies to be applied on a per-application and per-device basis to the selection of a WAN internet access connection to be used to carry that traffic. SD-WAN technology may use one or more metered ISP connections.

SD-WAN uses an architecture where the SD-WAN router at the customer Premise maintains a tunnel for each of its WAN connections that is terminated at an SD-WAN gateway. The SD-WAN router, as its policies dictate, can dynamically shift an upstream end-user IP flow from one tunnel to another to move that IP flow's packets from being carried by one WAN connection to the other without disrupting the IP flow's addressing as seen by either end of the flow. Similarly, the SD-WAN gateway, can dynamically shift a downstream end-user IP flow from one tunnel to another.

SUMMARY

Since VPN packets are encrypted, selecting the appropriate policy to determine which WAN connection an SD-WAN router or gateway should use for transferring a packet is problematic. Hence there is a need for a system and method to estimate what kind of traffic a VPN is carrying and determine which WAN connection to use for VPN network traffic.

The disclosure and claims herein are directed to a system and method for estimating the kind of traffic a VPN is carrying and determining which WAN connection to use for VPN network traffic to reduce usage costs while maintaining responsiveness. A VPN classifier examines VPN packets and estimates the type of traffic they are carrying and selects a policy for upstream or downstream traffic to determine which tunnel or tunnels to send network traffic. Further, policies may be applied to VPN packets as a function of a usage knob.

An example of disclosed systems can include a software defined wide area network (SD-WAN) network device comprising: a first wide area network (WAN) connection with a lower-cost per gigabyte and longer latency with a first virtual private network (VPN) tunnel connected to the network device; a second WAN connection with a higher-cost per gigabyte and lower-latency with a second VPN tunnel connected to the network device; and a VPN classifier that sets a tunnel selection policy for which tunnel or tunnels a VPN packet should be carried by, wherein the VPN classifier uses recent measurements of a VPN connection's packets to determine the tunnel selection policy.

An example of disclosed systems can include a software defined wide area network (SD-WAN) gateway that supports operation of one or more SD-WAN routers comprising: a first wide area network (WAN) connection with a lower-cost per GB and longer latency with a first VPN tunnel connected to an SD-WAN router; a second WAN connection with a higher-cost per GB and lower-latency with a second tunnel connected to the SD-WAN router; and a VPN classifier that sets a tunnel selection policy for which tunnel or tunnels an upstream VPN packet should be carried by, wherein the VPN classifier uses recent measurements of the VPN connection's packets to determine the tunnel selection policy, wherein the tunnel selection policy is updated on an ongoing basis using rules with factors based on VPN connection upstream and downstream packet size and measurements of upstream and downstream packets, and wherein the factors include a knob range of a usage knob, where usage knob which is a representative of an urgency for reducing usage of the second WAN connection with the higher-cost per GB and lower-latency.

An example of a disclosed method may include a method for assigning VPN network flow on a software defined wide area network (SD-WAN) network device comprising: monitoring VPN flow for a specified period of time; calculating traffic statistics of the VPN flow in the specified time period; applying classification rules to the traffic statistics; determining a tunnel selection policy based on matched classification rules with the highest score; and assigning VPN flow to a WAN interface based on the tunnel selection policy.

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

BRIEF DESCRIPTION OF THE DRAWINGS

The drawing figures depict one or more implementations in accord with the present teachings, by way of example

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

This disclosure describes systems and methods for estimating the kind of traffic a VPN is carrying and determining which WAN connection to use for VPN network traffic to reduce usage costs while maintaining responsiveness. A VPN classifier examines VPN packets and estimates the type of traffic they are carrying and selects an SD-WAN policy (also referred to herein as a "policy" or "selection policy") for the upstream or downstream VPN packets. The policy determines, together with current WAN status, which tunnel or tunnels thru which to send the VPN packets. Further, policies may be applied to VPN packets as a function of a usage knob as described herein.

Figure 1:
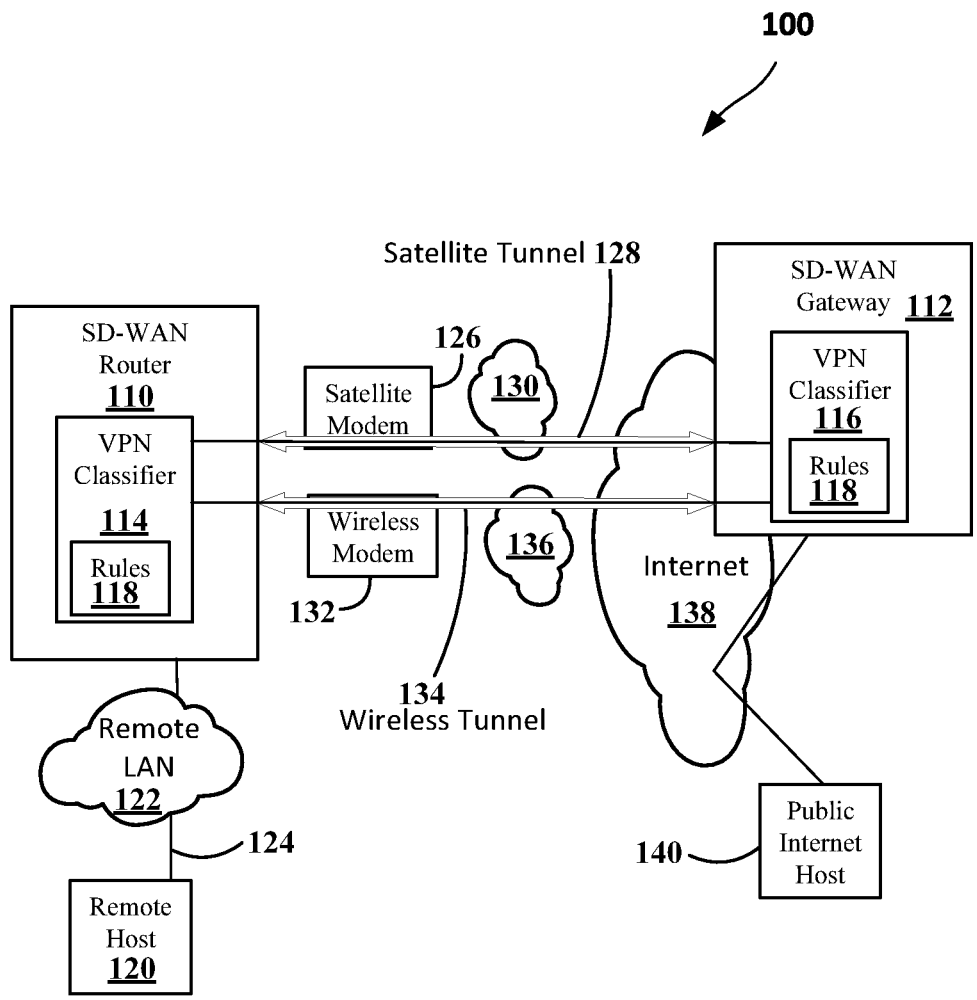
FIG. 1 illustrates a high-level block diagram of a system for VPN classification to reduce usage costs while retaining responsiveness.

FIG. 1 illustrates a high-level block diagram of a system 100 for VPN classification to reduce usage costs while retaining responsiveness. The system 100 operates in a satellite/wireless hybrid internet access setup where end user traffic, as dictated by the appropriate policies, may be carried between the SD-WAN Router 110 and SD-WAN gateway 112 via a combination of a satellite access network and a wireless access network as described below. The system 100 uses VPN classifiers 114, 116 with VPN classification rules 118 to dynamically adjust the policy applied to a VPN connection to more appropriately trade off the lower-cost per GB and higher thruput of a satellite metered internet connection with the lower latency but higher cost per GB of a wireless metered internet connection to provide a more responsive end-user experience than possible with a single satellite Internet connection at a lower-cost with higher bulk-transfer thruput than possible with a single wireless Internet connection.

Again referring to FIG. 1, the system 100 includes an SD-WAN router 110 which provides internet access for a remote host 120 over a remote local area network (LAN) 122 over a connection 124. In the illustrated implementation, the SD-WAN router 110 communicates with the SD-WAN gateway 112 over two WAN connections. The first WAN connection includes a satellite modem 126 that supports a satellite tunnel 128 through a satellite access network 130 to the SD-WAN gateway 112. The second WAN connection includes a wireless modem 132 that supports a wireless tunnel 134 through a wireless LTE access network 136 to the SD-WAN gateway 112. The WAN connections support network communication between the remote host 120 and a public internet host 140 over the internet 138. In the illustrated implementation the two WAN connections are a satellite connection and an LTE access network. Other alternatives are expressly contemplated. For example, in an alternative implementation a LEO (Low-Earth Orbit) satellite internet connection or a 5G wireless transport may be utilized in place of the LTE. Any combination of WAN connections may be implemented that support network communication controlled by the SD-WAN router and SD-WAN gateway as described herein.

Figure 2:
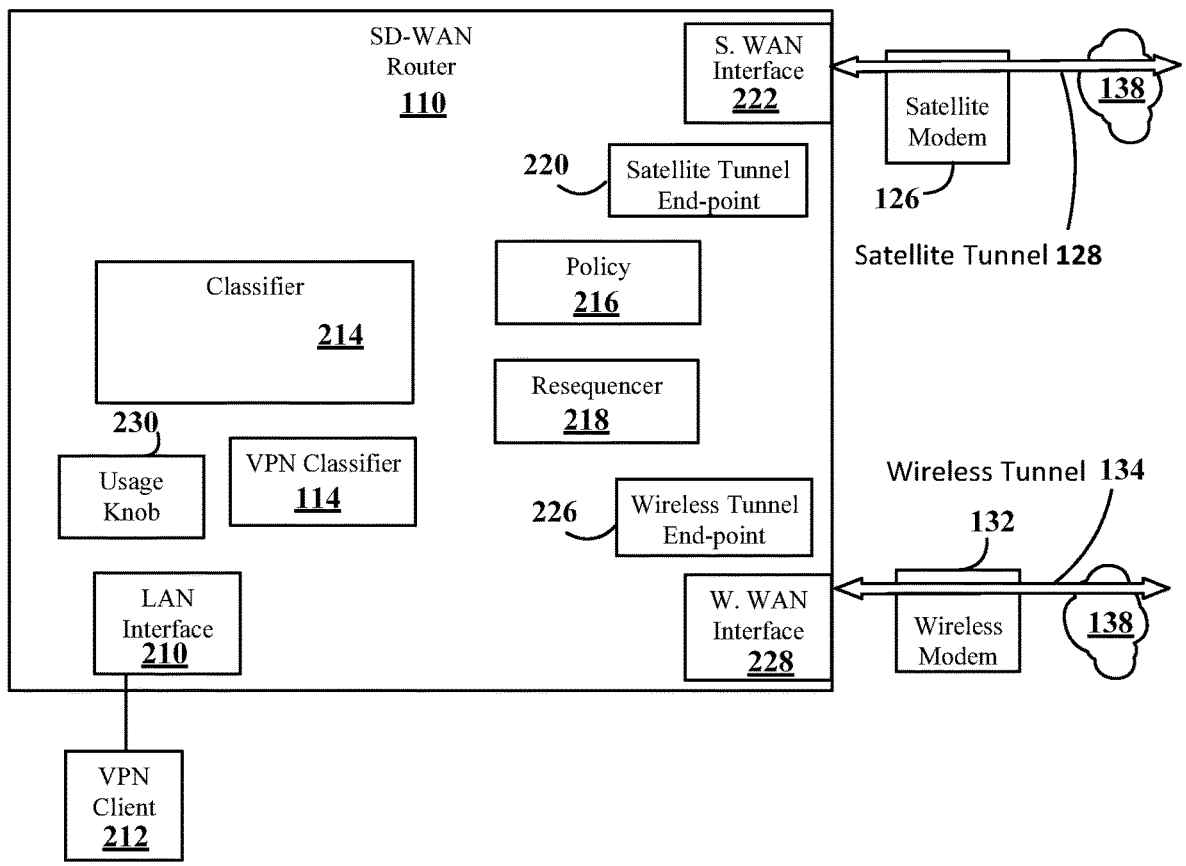
FIG. 2 illustrates a high-level block diagram of an SD-WAN router with a VPN classifier.

FIG. 2 illustrates a high-level block diagram of the SD-WAN router 110. The interconnection and operation of the blocks within the SD-WAN router 110 are described further below with reference to FIGS. 4 and 7. The SD-WAN router 110 utilizes a VPN classifier 114 to help set the policy for an Upstream VPN IP flow. The SD-WAN Router 110 includes a LAN interface 210 that allows it to exchange packets with multiple LAN host devices (with only one shown in the figure, in this case a VPN Client 212). The classifier 214 examines packet IP addresses, ports and other packet characteristics to identify IP flows (upstream and downstream). The VPN classifier 114 examines VPN packets and estimates the type of traffic they are carrying and selects SD-WAN policies for each upstream VPN packet. The SD-WAN policy block 216 determines which tunnel or tunnels through which to send an upstream packet based on an upstream packet's tagged policy. The SD-WAN resequencer 218 resequences an IP flow's received downstream packets. The satellite tunnel end-point 220 encapsulates upstream packets in another packet, a satellite tunnel packet, and de-encapsulates received satellite tunnel packets. The satellite WAN interface 222 sends and receives packets via a satellite modem 126 on the satellite tunnel 128 over the satellite access network 130 (FIG. 1) and onto the public internet 138. The wireless tunnel end-point 226 encapsulates upstream packets in another packet, a satellite tunnel packet, and de-encapsulates received satellite tunnel packets. The wireless WAN interface 228 sends and receives packets via the wireless modem 132 on the wireless tunnel 134 over the wireless access network 136 (FIG. 1) and on to the public internet 138. The SD-WAN router 110 may further include a usage knob 230 that is used by the VPN classifier 114 as described further below.

Figure 3:
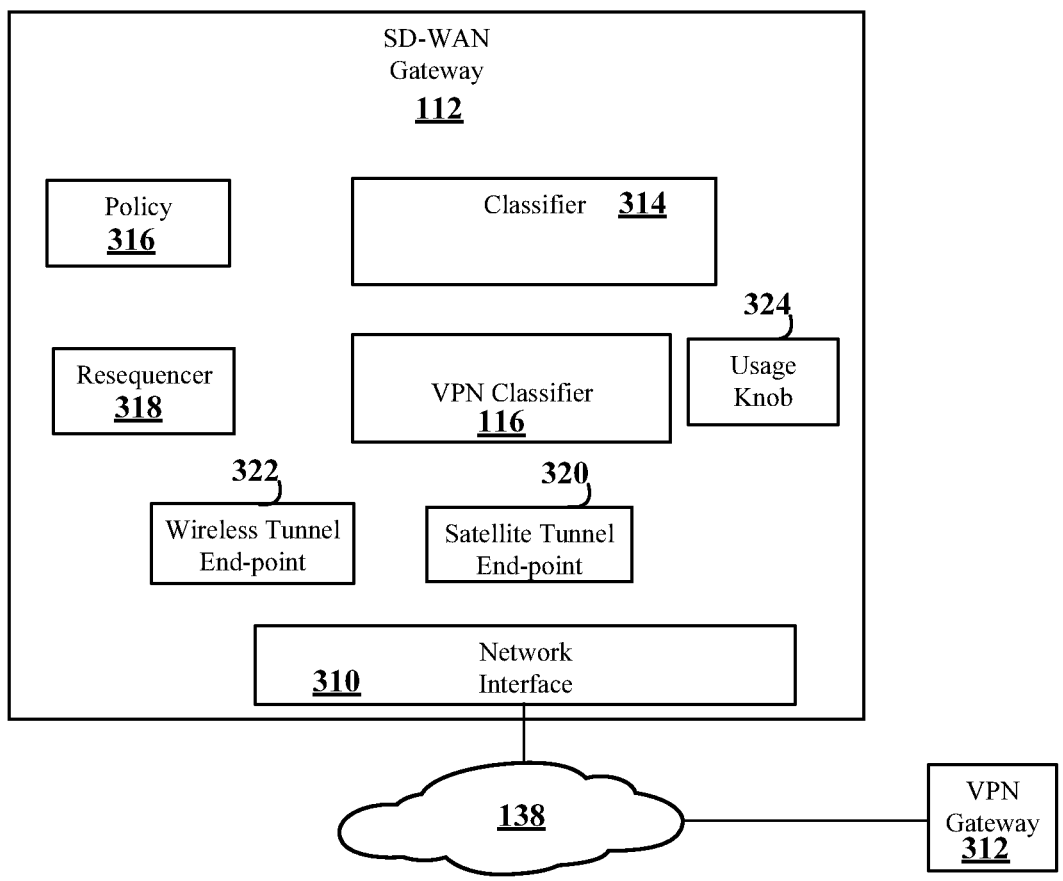
FIG. 3 illustrates a high-level block diagram of an SD-WAN gateway with a VPN classifier.

FIG. 3 illustrates a block diagram of an implementation of the SD-WAN gateway 112. The interconnection and operation of the blocks within the SD-WAN gateway 112 are described further below with reference to FIGS. 5 and 6. The SD-WAN gateway 112 utilizes a VPN classifier 116 to set the policy for a downstream VPN IP flow. The organization of an SD-WAN gateway 112 is similar, but not identical, to that of the SD-WAN Router 110 described above. A significant difference is that an SD-WAN gateway 112 typically supports communications with multiple SD-WAN routers while an SD-WAN router often communicates with a single SD-WAN Gateway (or a small number of SD-WAN Gateways). The SD-WAN gateway 112 includes a network interface 310 through which it sends and receives satellite and wireless tunnel packets via the public internet 138. In the implementation shown, this same network interface 310 also sends and receives packets to public internet servers (in this case a VPN gateway 312) via the public internet. In another implementation, an SD-WAN Gateway has a separate Network Interface that sends and receives un-tunneled packets to their upstream host(s). This is useful when the SD-WAN is supporting a private network. The classifier 314 examines packet IP addresses, ports and other packet characteristics to identify IP flows (upstream and downstream). The VPN classifier 116 examines VPN packets and estimates the type of traffic they are carrying and selects the SD-WAN policy for each downstream VPN packet. The policy object 316 determines which tunnel or tunnels through which to send a downstream packet based on a downstream packet's tagged policy. The SD-WAN resequencer 318 resequences an IP flow's received upstream packets. The satellite tunnel end-point 320 encapsulates downstream packets in another packet, a satellite tunnel packet, and de-encapsulates received satellite tunnel packets. The wireless tunnel end-point 322 encapsulates downstream packets in another packet, a satellite tunnel packet, and de-encapsulates received satellite tunnel packets. The SD-WAN gateway 112 may further include a usage knob 324 that is used by the VPN classifier 116 as described further below.

Figure 4:
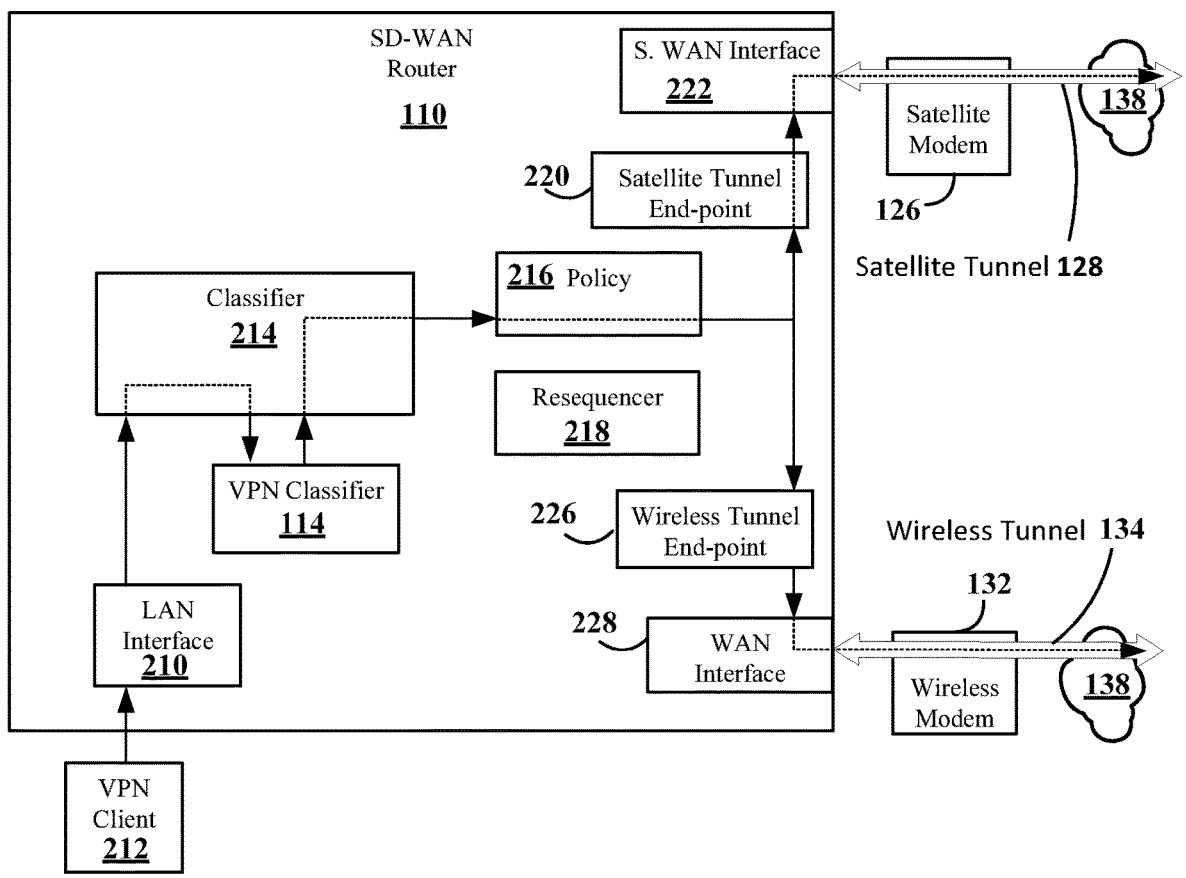
FIG. 4 illustrates upstream packet flow through the SD-WAN router.
Figure 5:
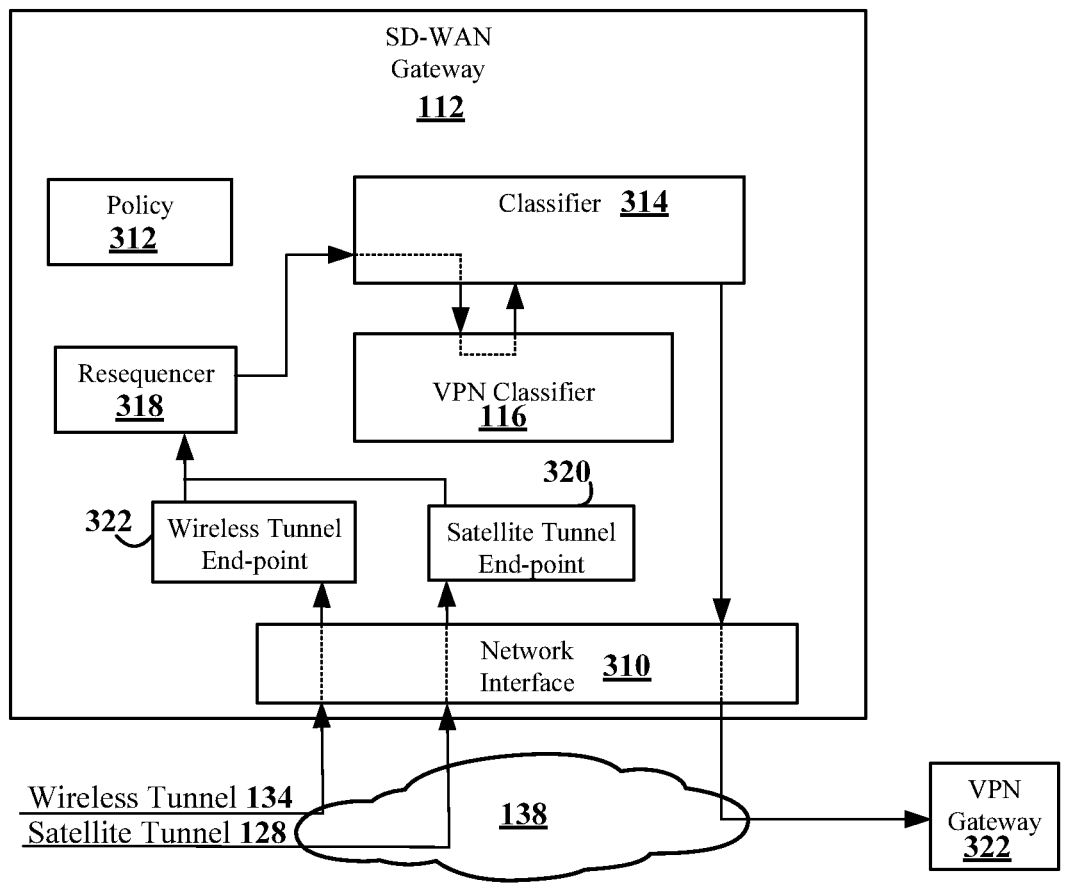
FIG. 5 illustrates upstream packet flow through the SD-WAN gateway.

FIGS. 4 and 5 illustrate upstream packet flow through the system 100 described above. FIG. 4 illustrates the upstream packet flow through the SD-WAN router 110. In the illustrated implementation, the SD-WAN router 110 processes upstream VPN packets as shown by the arrows from the VPN client 212. The VPN client 212 sends packets to its VPN gateway via the SD-WAN Router 110. The LAN interface 210 (typically with its TCP/IP stack) passes the packets into the classifier 214 which identifies packets as being part of a VPN connection. The classifier 214 passes the VPN packets thru the VPN classifier 114 which measures the packet and, based on the measurement of the VPN connection's upstream and downstream packets estimates the type of traffic currently being carried by the VPN connection. In the illustrated implementation, the Classifier 214 tags upstream packets which are not VPN packets itself with the appropriate policy and forwards those packets to the SD-WAN policy block 216 without passing them thru the VPN classifier 114. The VPN classifier 114, based on the estimated traffic type and the usage knob setting, tags the packet with the SD-WAN policy to be applied to the packet and forwards the packet back to the classifier 214. In an alternative implementation, the VPN classifier 114 forwards the tagged packet to the SD-WAN policy block 216 directly without passing it back thru the classifier 214. The classifier 214 forwards the packet to the SD-WAN policy block 216 which, based tagged policy and on the current measured characteristics of the satellite WAN connection and the wireless WAN connections forwards the packet into the satellite tunnel end-point 220 or the wireless tunnel end-point 226 or both. The satellite tunnel end-point 220 encapsulates the packet, when the policy calls for it to be sent via satellite, and forwards it thru the satellite WAN interface 228 thru to the satellite modem 126 and its Metered ISP on the satellite tunnel 128 thru the public internet 138 to the SD-WAN gateway 112 (FIG. 1). Examples of such encapsulation techniques include Generic Routing Encapsulation (GRE) and IPSec tunneling. The wireless tunnel end-point 226 encapsulates the packet, when the policy calls for it to be sent via wireless, and forwards it thru the wireless WAN interface 228 thru the wireless modem 132 and its Metered ISP on the wireless tunnel 134 thru the public internet 138 to the SD-WAN Gateway 112 (FIG. 1).

FIG. 5 illustrates the upstream packet flow through the SD-WAN gateway 112. The SD-WAN Gateway's processing of an upstream tunneled VPN packet, in the preferred embodiment is as follows. Packets are received over the wireless tunnel 134 and the satellite tunnel 128 on the public internet as described above and delivered to the network interface 310 based on the outer packet header's destination address. The network interface 310 (and typically its TCP/IP stack) delivers the packet, when it is being carried by the satellite tunnel 128, to the satellite tunnel end-point 320 which de-encapsulates the packet and forwards it to the SD-WAN resequencer 318. The network interface 310 (and typically its TCP/IP stack) delivers the packet, when it is being carried by the wireless tunnel 134, to the wireless tunnel end-point 322 which de-encapsulates the packet and forwards it to the SD-WAN resequencer 318. The SD-WAN resequencer 318, on a per IP-flow basis, puts an IP flow's packets back in sequence when practical and forwards packets immediately when they are in-sequence or with sequence gaps (or potentially out of sequence) when they have been buffered waiting to become in sequence for a seemingly long enough period of time. The SD-WAN resequencer 318 forwards the packet to the classifier 314 which identifies the packet as being part of a VPN connection. The classifier 314 passes VPN packets, of which this is one, to the VPN classifier 116. In this implementation, the classifier 314 bypasses the VPN classifier 116 and forwards upstream packets which are not VPN packets directly out the network interface 310 on their way to their addressed destination. The VPN classifier 116 measures the packet, as part of measuring the VPN connection's behavior, and forwards it back thru the classifier 314. In an alternative implementation the VPN classifier 116 forwards the upstream VPN packet to the network Interface 310 directly without passing it back thru the classifier 314. The classifier 314 forwards the packet thru the network interface 310 (and typically its IPSec Stack). The network interface 310 forwards the packet on its way thru the public internet on its way to the VPN gateway 322.

Figure 6:
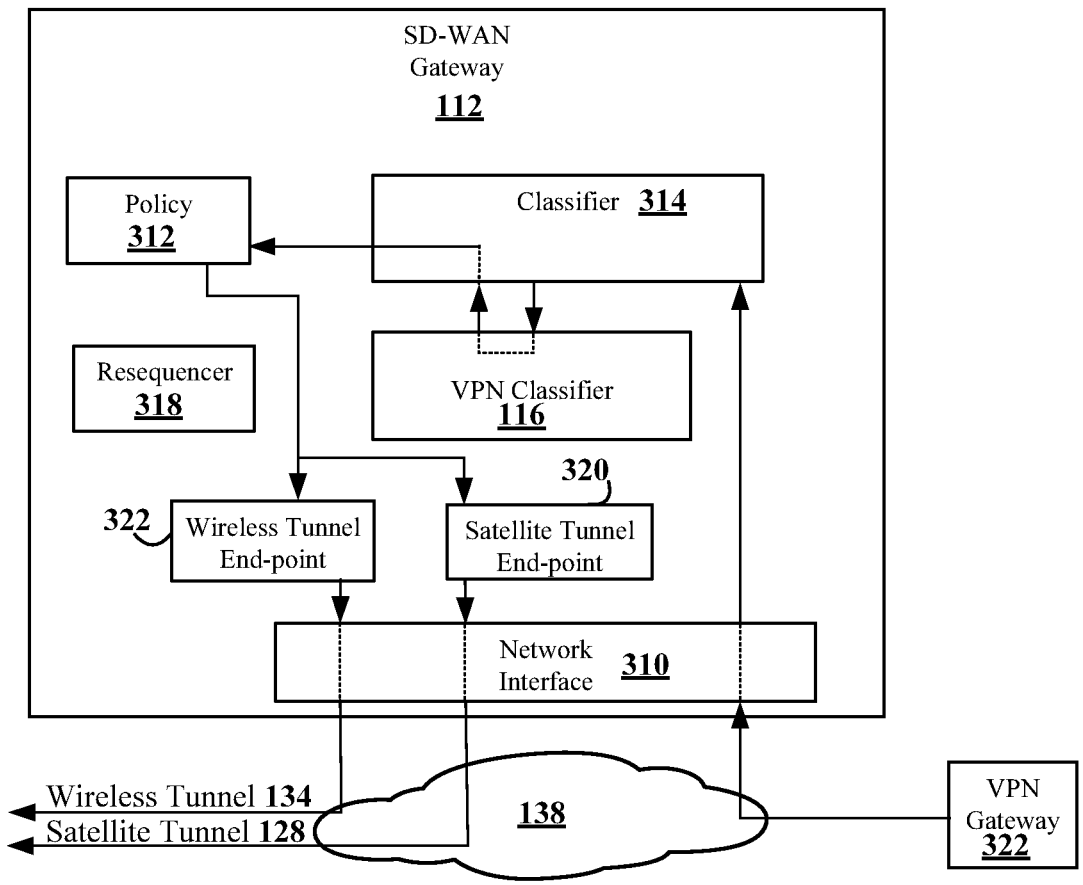
FIG. 6 illustrates downstream packet flow through the SD-WAN gateway.
Figure 7:
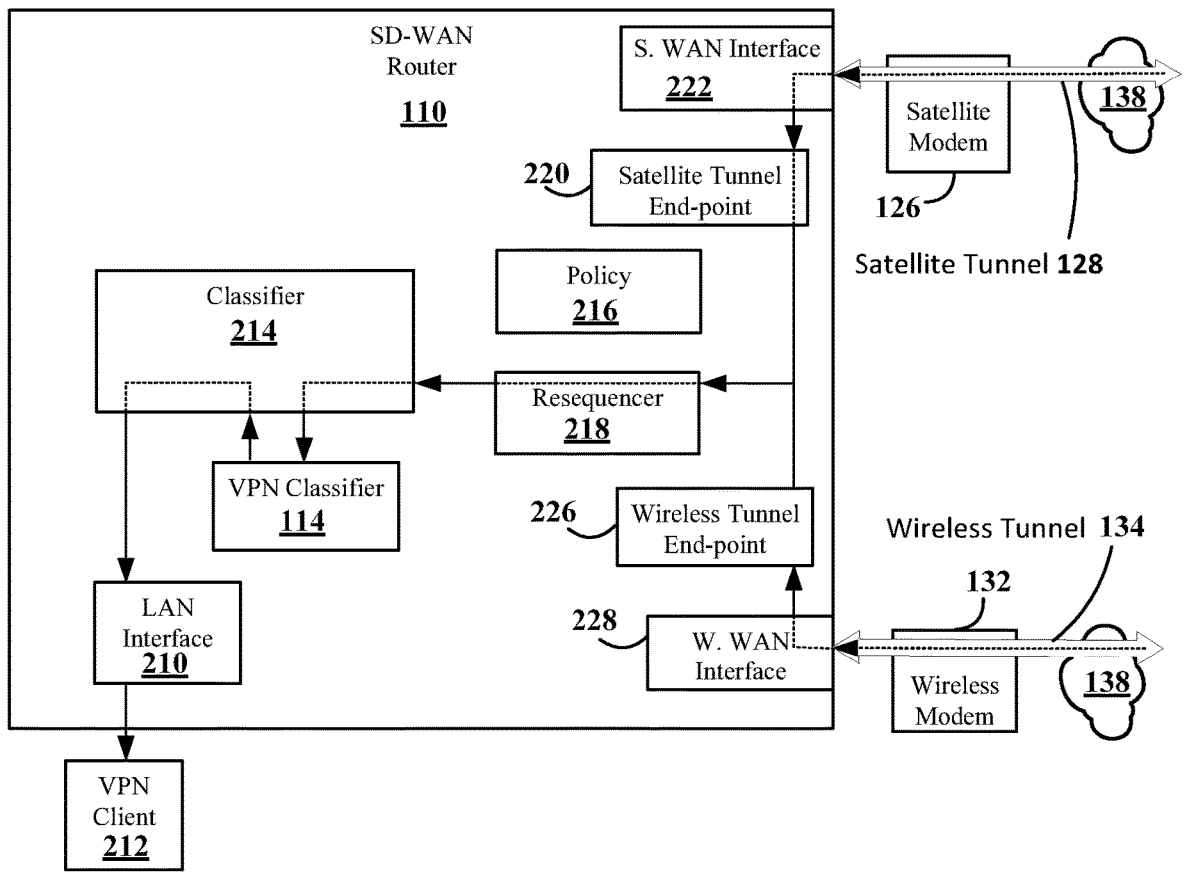
FIG. 7 illustrates downstream packet flow through the SD-WAN router.

FIGS. 6 and 7 illustrate downstream packet flow through the system 100 described above. FIG. 6 illustrates the downstream packet flow through the SD-WAN gateway 112. The SD-WAN Gateway's 112 processing of a downstream VPN packet from the VPN gateway 322 to the VPN client 212 (FIG. 7) in the preferred embodiment, is as follows. First, the VPN gateway 322 sends packets over the public internet 138 to the network interface 310 of the SD-WAN gateway 112. This SD-WAN gateway processes packets to send to SD-WAN router 110 either by performing a Network Address Port Translation (NAPT) operation on the untunneled VPN packets thus causing the VPN gateway 322 to send downstream packets via the SD-WAN gateway 112 or by the SD-WAN gateway 112 advertising a route to the VPN Client. The network interface 310 (typically with its TCP/IP stack) passes to the classifier 314 downstream packets which are not tunneled packets from a SD-WAN router 110 and which are destined to be carried by a tunnel downstream to a SD-WAN router 110. The classifier 314 identifies a downstream VPN packet as being part of a VPN connection and passes the packet thru the VPN classifier 116. In the illustrated implementation, the classifier 314 tags downstream packets which are not VPN packets itself with the appropriate policy and forwards those packets to the SD-WAN policy block 312 without passing them thru the VPN classifier 116. The VPN classifier 116 measures the packet and, based on the measurement of the VPN connection's upstream and downstream packets estimates the type of traffic currently being carried by the VPN connection. The VPN classifier 116, based on the estimated traffic type and the usage knob setting, tags the packet with the SD-WAN policy to be applied to the packet and forwards the packet back to the classifier 314. In an alternative implementation, the VPN classifier 116 forwards the tagged packet to the SD-WAN policy block 312 directly without passing it back thru the classifier 314. The classifier 314 forwards the packet to the SD-WAN policy block 312 which, based on the tagged policy and current measured characteristics of the satellite WAN connection and the wireless WAN connections forwards the packet into the satellite tunnel end-point 320 or the wireless tunnel end-point 322 or both. The satellite tunnel end-point 320 encapsulates the packet, when the policy calls for it to be sent via satellite, and forwards the encapsulated packet thru the network on its way thru the public internet and back thru the satellite metered ISP to the SD-WAN router 110 (FIG. 7). Examples of such encapsulation techniques include Generic Routing Encapsulation (GRE) and IPSec tunneling. The wireless tunnel end-point 322 encapsulates the packet, when the policy calls for it to be sent via wireless, and forwards the encapsulated packet thru the network on its way thru the public internet and back thru the wireless metered ISP to the SD-WAN router 110.

FIG. 7 illustrates the downstream packet flow through the SD-WAN router 110. The SD-WAN Router's processing of a downstream tunneled VPN packet, in the illustrated implementation is as follows. The public internet 138 carries such a packet and routes it thru either the satellite or wireless metered ISP and delivers it to the satellite WAN interface 222 or wireless WAN interface 228 based on the outer packet header's destination address. The satellite WAN interface 222 (and typically its TCP/IP stack) delivers the packet, when it is being carried by the satellite tunnel 128, to the satellite tunnel end-point 220 which de-encapsulates the packet and forwards it to the resequencer 218. The wireless WAN interface 228 (and typically its TCP/IP stack) delivers the packet, when it is being carried by the wireless tunnel 134, to the wireless tunnel end-point 226 which de-encapsulates the packet and forwards it to the SD-WAN resequencer 218. The resequencer 218, on a per IP-flow basis, puts an IP flow's packets back in sequence when practical and forwards packets immediately when they are in-sequence or with sequence gaps (or potentially out of sequence) when they have been buffered waiting to become in sequence for a seemingly long enough period of time. The resequencer 218 forwards the packet to the classifier 214 which identifies the packet as being part of a VPN connection. The classifier passes VPN packets, of which this is one, to the VPN classifier 114. The Classifier bypasses the VPN classifier 114 and forwards downstream packets which are not VPN packets directly out the LAN interface on their way to their addressed LAN host. The VPN classifier 114 measures the packet, as part of measuring the VPN connection's behavior, and, in the illustrated implementation, forwards it back thru the classifier 214. Alternatively, in another implementation the VPN classifier 114 may forward the downstream VPN packet to the LAN interface 210 directly without passing it back thru the classifier 214. The classifier 214 forwards the packet thru the LAN interface 210 (and typically its IPSec Stack). The LAN interface 210 forwards the packet on its way across the LAN on its way to the VPN client 212.

Figure 8:
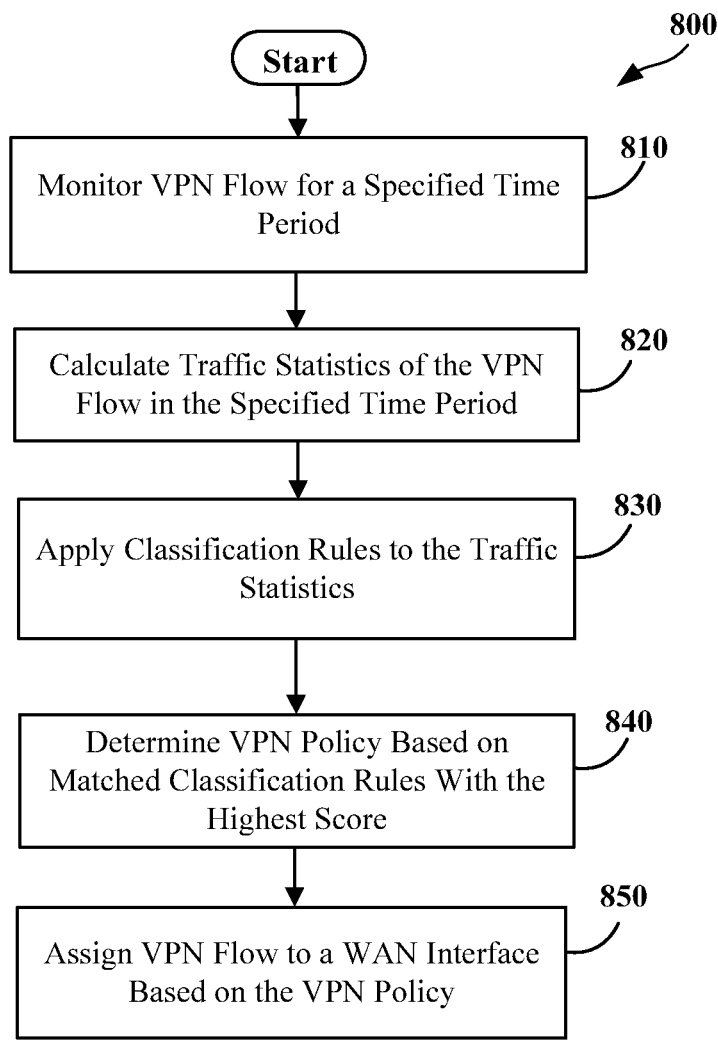
FIG. 8 is a sequence diagram illustrating a method for VPN classification to reduce usage costs while retaining responsiveness in accordance with this disclosure.

FIG. 8 is a flow diagram of a process or method 800 for VPN classification to reduce usage costs while retaining responsiveness in accordance with this disclosure. Operations in the example method 800 could be performed by various entities in system 100. This flow diagram is only for purposes of example and is not intended as a limitation regarding implementations and practices in accordance with this disclosure. First, the system monitors VPN flow for a specified period of time, for example about 500 ms (step 810). The system then calculates traffic statistics of the VPN flow in the specified time period (step 820). Next, the system applies classification rules to the traffic statistics (step 830). The system then determines a SD-WAN selection policy based on matched classification rules with the highest score (step 840) and then assigns VPN flow to a WAN interface based on the VPN policy (step 850).

VPN Classifier Packet Measurements and Calculations

As has been discussed, the VPN classifiers 114, 116 examine and measure VPN connections upstream and downstream packets. The term VPN classifier as used herein refers to both the upstream VPN classifier 114 and the downstream VPN classifier 116. As will be discussed in an upcoming section, these measurements are restarted on an on-going basis (typically on a periodic basis) where the time between restarts is referred to as a measurement period. For each upstream packet, the VPN classifier 114 performs the following steps.

- Add the packet size to an upstream packet size total since the start of the current measurement period thereby allowing a bit rate to later be calculated.
- Increment the count of upstream packets since the start of the current measurement period thereby allowing a mean-packet size to later be calculated.
- Maintain a set of packet size ranges with the count of upstream packets in that range since the start of the current measurement period and increment the count of packets for packet size range that the packet's size falls into. The count of the number of packets in various ranges is a mechanism for measuring the distribution of packet sizes or packet size distribution. In one implementation, there are 8 buckets with the ranges from 0 . . . 199, 200 . . . 399 and so on to packet size of 1400 bytes or greater. This allows, for example, the fraction of large and small packets to be later be calculated.
- Measure the packet-interarrival time (the time since a previous of this IP flow's packet was received) and count the number of such packet inter-arrival times that are less than a configurable threshold since the start of the current measurement period.
- Measure the packet-interarrival time (the time since a previous of this IP flow's packet was received) and keep the maximum such interarrival time since the start of the current measurement period. For each downstream packet, the VPN classifier 116 does the same only for inbound packet measurements.

VPN Classifier Periodic Calculations

The VPN Classifier, in the illustrated implementation, on an on-going basis and preferably on a periodic basis, totals up the per-packet measurements and calculations to help characterize the traffic the VPN connection is carrying. The period of time between such calculations is referred to as a measurement period and the totaling up of measurements is based on the packets received during that measurement period. In the preferred embodiment the measurement period is 5 seconds long. The VPN Classifier computes (upstream and downstream) the following for each such a measurement period.

Thruput (aka Bit rate)—computed from the duration of the period and the total size of the upstream or downstream packets.
Packets-Per-Second (PPS)—computed from the duration of the period and the number of packets processed.
Number of packets in each packet size range.
Maximum period of time between packets (measured in milliseconds in the preferred embodiment).
Number of packets which arrive with an interpacket arrival time (the time since the previous packet) less than a configurable threshold, default of 100 milliseconds.

VPN Classifier Periodic Traffic Policy General Principles

The VPN Classifier, in the illustrated implementation, updates an outbound VPN IP flow's policy once every measurement period. The update is based on the current and recent measurement period measurements and the usage knob setting. The usage knob setting is generally based on how much LTE usage is to be reduced where a higher knob setting indicates a higher desired level of LTE usage reduction. The usage knob in the preferred embodiment is set based on the LTE usage month-to-date as it is compared to a threshold monthly limit and how much of the month remains. The general principles guiding the policy selection are as follows: As the usage knob increases, the policy progressively shifts more traffic to satellite starting with downstream traffic. Downstream traffic is shifted first because it has lower latency than upstream traffic which, due to upstream bandwidth reservation techniques, may involve an extra satellite round-trip. When minimizing LTE use is important, all of the VPN's traffic in a given direction should go over satellite when any of its traffic should go over satellite. This is because satellite capacity is sufficient to handle a VPN connection's traffic and therefore if the traffic is split between satellite and LTE during resequencing of the satellite and LTE packets all of those packets are impacted by satellite's higher latency. Another general principle is that VPN traffic is latency sensitive and should be given a high priority when the underlying SD-WAN tunneling mechanism includes support for traffic prioritization or providing Quality Of Service even when a VPN IP flow is set to be carried exclusively by satellite. In the preferred embodiment, for flexibility and adjustability, the categorization of traffic is based on a set of configurable rules where, at any given time, more than one rule may "match" recent traffic and the current usage knob setting and where each such rule has a configured score and where the highest-scoring matching rule categorizes the traffic and thus selects the IP flow's policy.

Detected Traffic Types and their Handling

The VPN Classifier's classification rules provide a means for estimating traffic of the types that are identified in the table that follows. Table 1 shows some examples of VPN traffic types. The Usage Urgency column qualitatively indicates what the usage knob setting is calling for in terms of how aggressively usage should be shifted to Satellite and is one or more of the following: Low, Med (medium) and High. The resulting policy is shown in the table's Preferred Transport are as follows: SATELLITE—utilize the satellite Internet connection when it is working well and fall-back to wireless when not and when wireless is working well. WIRELESS—utilize the wireless Internet connection when it is working well and fall-back to satellite when not and when satellite is working well.

TABLE 1

| Traffic Type | Direction | Usage Urgency | Preferred Transport | Description |
|---|---|---|---|---|
| Deep Idle | Up & Dn | Low | SATELLITE | When traffic has been consistently low a longer time. Minimize WIRELESS usage. |
|  | Up & Dn | Med & High | SATELLITE |  |
| Light Idle | Up | Low | WIRELESS | When traffic has been consistently low for a short period of time. Minimize upstream latency. |
|  | Dn | Low | SATELLITE | Save WIRELESS usage |
|  | Up & Dn | Med & High | SATELLITE | Minimize WIRELESS usage |
| Voice Only Call | Up & Dn | Low | WIRELESS | A voice only person-to-person or conference call. |
|  | Up | Med | WIRELESS |  |
|  | Dn | Med | SATELLITE | Save bandwidth on the lower-latency Satellite downstream. |
|  | Up & Dn | High | SATELLITE | Save bandwidth even though the delay will be very noticeably bad. |
| Audio Conf Call Mic Muted | Up & Dn | Low | WIRELESS | A conference call where the user's Microphone is muted. Low Urgency == best service. |
|  | Up & Dn | Med & High | SATELLITE | Minimize WIRELESS usage since responsiveness is not needed because the user is not talking. |

TABLE 1-continued

| Traffic Type | Direction | Usage Urgency | Preferred Transport | Description |
|---|---|---|---|---|
| Audio Conf Call Mic Unmuted | Up & Dn | Low | WIRELESS | A conference call where the user's Microphone is not muted. Low Urgency == best service. |
| | Up | Med | WIRELESS | Maintain responsiveness. |
| | Dn | Med | SATELLITE | Give up some responsiveness |
| | Up & Dn | High | SATELLITE | Give up responsiveness to reduce LTE usage. |
| Video Conf Call Mic Muted | Up & Dn | Low | WIRELESS | A conference call where the user's Microphone is muted. Low Urgency == best service. |
| | Up & Dn | Med & High | SATELLITE | Minimize WIRELESS usage since responsiveness is not needed. |
| Video Conf Call Mic Unmuted | Up & Dn | Low | WIRELESS | A conference call where the user's Microphone is not muted. Low Urgency == best service. |
| | Up | Med | WIRELESS | Maintain responsiveness. |
| | Dn | Med | SATELLITE | Give up some responsiveness |
| | Up & Dn | High | SATELLITE | Give up responsiveness to reduce LTE usage. |
| Bulk Dnload | Up | Low & Med | WIRELESS | Minimize ack delay to increase thruput |
| | Dn | Low & Med | SATELLITE | Minimize WIRELESS usage. |
| | Up & Dn | High | SATELLITE | Minimize WIRELESS usage. |
| Bulk Upload | Up | Low & Med | SATELLITE | Minimize WIRELESS usage. |
| | Dn | Low & Med | WIRELESS | Minimize ack delay to increase thruput |
| | Up & Dn | High | SATELLITE | Minimize WIRELESS usage. |
| Other | Up & Dn | Low | WIRELESS | Maximize responsiveness |
| | Up | Med | WIRELESS | Keep some WIRELESS responsiveness |
| | Dn | Med | SATELLITE | Reduce WIRELESS usage |
| | Up & Dn | High | SATELLITE | Minimize WIRELESS usage |

VPN Classification Rule Format

The VPN classifier receives a set of VPN Classification rules that are used to estimate traffic type and, as a function of usage knob setting, select the SD-WAN policy to be applied to an outbound IP flow. Each rule, in the preferred embodiment, has the following mandatory and optional parameters that define the actions to be taken when the rule matches recent measurement period measurements:

name (<alphanumeric+'_'>)—REQUIRED, for documentation, tracing and logging purposes.

description(<string>')—REQUIRED, explains for documentation purposes what kind of traffic the rule is intended to match and what the resulting policy should be.

score (<dec>)—REQUIRED, this rule's score where the highest matching score's action criteria are put in place.

knobrange (<dec>,<dec>)—OPTIONAL with a default of 0, 100. This rule only applies when the LTE usage knob is within the range.

upcontractid (<alphanumeric+'_'>~ . . . )—OPTIONAL, overrides the default upstream performance contract for this flow when the rule is the high-scoring match. May have multiple '~' separated contract IDs where the first applies to knob level one, the second to knob level two and so on where the last applies to its knob level and all higher knob levels. NOTE: The upcontractid field is used by the SD-WAN Router and the SD-WAN Router ignores rules that do not have an upcontractid parameter. NOTE: A performance contract defines an SD-WAN policy which may be as simple as always use one WAN or the other or may define various characterizations of expected performance (thruput capacity, latency, jitter, etc.) to guide the WAN selection. A typical rule's performance contract specifies a preferred WAN provided it is operating reasonably well compared to the other WAN.

dncontractid ('<alphanumber+'_'>~ . . . )—OPTIONAL, overrides the default dnstream performance contract for this flow when the rule is the high-scoring match. May have multiple '~' separated contract IDs where the first applies to knob level one, the second to knob level two and so on where the last applies to its knob level and all higher knob levels. NOTE: The dncontractid field is used by the SD-WAN Gateway and the SD-WAN Gateway ignores rules that do not have an upcontractid parameter.

Each rule has a set of match criteria which are used to determine, at the end of a measurement period, whether the rule has matched recent measurement period measurements.

multiperiodmatch (<dec N>~<dec M>)—OPTIONAL, with a default of 1, 1 (matches on any single matching reading). This rule only matches when at least, N of the last M measurement periods otherwise matched this rule.

or (<flag>~<flag> . . . )—OPTIONAL, when present, instead of requiring that all of the specified ranges match, all of the non-default ranges must match except those listed in this parameter's values where at least one of those listed in this parameter must match percentdnstreamrange(<dec>,<dec>)—OPTIONAL with a default of 0, 100 (matching any percentage of downstream traffic). This refers to the percent of traffic (in bytes) downstream during the measurement period.

upmaxinterpacketmsrange (<dec>~<dec>)—OPTIONAL, with a default of 0 and very large value thereby matching virtually any value.

upsmallinterpacketmspercentrange—OPTIONAL, with a default of 0 and 100 thereby matching with a default of virtually any value. Gives the percentage of upstream packets which arrive less than a configurable threshold ms (default=100) from the previous packet.

upthruputrange (<dec>~<dec>)—OPTIONAL, with a default of 0 and a very large value thereby matching any upstream thruput value. Gives the range of acceptable upstream thruput for the measurement period in units of kilobits/sec.

upppsrange(<dec>~<dec>)—OPTIONAL has the upstream packets per second range with a default of 0 and a very large value thereby matching upstream packet per second measurement.

uppacketsizerangelist (<list entry>;<list entry> . . . ) OPTIONAL with one or more ';' delimited list entries. The list entries are formatted as: (<hex>~<dec>~<dec>) where the hex is a hexadecimal bit map with 8 bits with each bit corresponding to one of the packet size buckets, first decimal is the low end of the range and the second decimal is the high end of the range.

uppercentsmallpktrange(<dec>,<dec>)—OPTIONAL with a default of 0 to 100, a convenient way of configuring an uppacketsizerangelist entry for packets from 0 to 399 bytes in length.

uppercentlargepktrange(<dec>,<dec>)—OPTIONAL with a default of 0 to 100, a convenient way of configuring an uppacketsizerangelist entry for packets >1200 bytes in length.

uppercentverylargepktrange(<dec>,<dec>)—OPTIONAL with a default of 0 to 100, a convenient way of configuring an uppacketsizerangelist entry for packets >1400 bytes in length.

dnmaxinterpacketmsrange (<dec>~<dec>)—OPTIONAL, with a default of 0 and very large value thereby matching virtually any value.

dnsmallinterpacketmspercentrange—(<dec>~<dec>) OPTIONAL, with a default of 0 and 100 thereby matching virtually any value. Gives the percentage of downstream packets which arrive less than a configurable threshold ms (default=100) from the previous packet.

dnthruputrange (<dec>~<dec>)—OPTIONAL, with a default of 0 and a very large value thereby matching any dnstream thruput value. Gives the range of acceptable downstream thruput for the measurement period in units of kilobits/sec.

dnppsrange(<dec>~<dec>)—OPTIONAL has the downstream packets per second range with a default of 0 and a very large value thereby matching downstream packet per second measurement.

dnpacketsizerangelist (<list entry>;<list entry> . . . ) OPTIONAL with one or more ';' delimited list entries. The list entries are formatted as: (<hex>~<dec>~<dec>) where the hex is a hexadecimal bit map with 8 bits with each bit corresponding to one of the packet size buckets, first decimal is the low end of the range and the second decimal is the high end of the range.

dnpercentsmallpktrange(<dec>,<dec>)—OPTIONAL with a default of 0 to 100, a convenient way of configuring an uppacketsizerangelist entry for packets from 0 to 399 bytes in length.

dnpercentlargepktrange(<dec>,<dec>)—OPTIONAL with a default of 0 to 100, a convenient way of configuring an uppacketsizerangelist entry for packets >1200 bytes in length.

dnpercentverylargepktrange(<dec>,<dec>)—OPTIONAL with a default of 0 to 100, a convenient way of configuring an uppacketsizerangelist entry for packets >1400 bytes in length.

VPN Classification Rule Examples

The following tables provide example classification rules for common traffic types. These rules may evolve over time as traffic types change and as a better understanding of the characteristics of various traffic types is accumulated. The set of rules to be used are typically arrived at empirically, that is, by generating an example type of traffic and examining the traffic characteristics and selecting a combination of match criteria peculiar to that traffic. The set of rules can be customized as needed to detect specific types of traffic including, for example, the traffic characteristics of different vendors' conferencing applications.

The first rule shown in Table 2 defines a WAN selection policy to be used the traffic is deemed to be "idle" and that no end-user is expected to be actually waiting for something to complete.

TABLE 2

| Parameter | Value | Explanation |
| --- | --- | --- |
| Name | Idle | Provides the name for this rule. |
| description | "Identify situations where traffic indicates that no human has been waiting for operations to complete. Idle traffic should be carried with minimum cost regardless of usage knob setting." | Describes the type of traffic the rule is carrying and the desired policy for that kind of traffic. |
| Score | 1100 | A relatively low score so that other rule matches will take precedence should they occur. |
| knobrange | 1~6 | Use this rule regardless of knob setting. |
| upcontractid | preferSatellite | The policy is to use the satellite to carry this traffic provided it is working well. |
| dncontractid | preferSatellite | The policy is to use the satellite to carry this traffic provided it is working well. |
| multiperiodmatch | 1~2 | The rule matches when either the current measurement period or the previous measurement period matched. |
| Or | dnmaxinterpacketmsrange~up-maxinterpacketmsrange~dnpps-range~upppsrange | All of these match criteria are deemed to have matched when any of these match criteria match. |
| dnppsrange | 0~1 | Match on downstream packets per second between 0 and 1 inclusive. |
| upppsrange | 0~1 | Match on upstream packets per second between 0 and 1 inclusive. |
| dnmaxinterpacket msrange | 800~2000000000 | Match when the maximum downstream packet inter-arrival time is at least 800 ms. |
| upmaxinterpacket msrange | 800~2000000000 | Match when the maximum upstream packet inter-arrival time is at least 800 ms. |

A second rule shown in Table 3 defines the policy to be used the traffic is that of a bulk upload (for example sending and email with a large picture attached).

TABLE 3

| Parameter | Value | Explanation |
| --- | --- | --- |
| Name | BulkUpload | Provides the name for this rule. |
| description | "Traffic that is dominated by high-speed and large packets is deemed to be an upload which should be carried via satellite. When the usage knob is not elevated the acknowledgement traffic (downstream traffic) is carried wireless which should allow for a higher-speed upload." | Describes the type of traffic the rule is carrying and the desired policy for that kind of traffic. |
| Score | 100000 | A relatively high score so that other rule matches will not take precedence should they occur. |
| knobrange | 1~6 | Use this rule regardless of knob setting. |
| upcontractid | preferSat | The policy is to use the satellite to carry this traffic provided it is working well. |
| dncontractid | preferWireless, preferSatellite | The policy is to use the wireless when wireless usage has been consistently low (usage knob level 1) and to use satellite otherwise to conserve the more expensive wireless usage. |

TABLE 3-continued

| Parameter | Value | Explanation |
| --- | --- | --- |
| multiperiodmatch | 1~1 | The rule matches when the current measurement period matched. |
| upthruputrange | 300~2000000000 | Match on high upstream thruput (above 300 kbps). |
| dnthruputrange | 10~500 | Match on low to moderate downstream thruput. |
| Uppercentvery largepktrange | 90~100 | Match when upstream packets are consistently (at least 90%) very large (>1400 bytes) |
| dnpercentsmall pktrange | 90~100 | Match when downstream packets are consistently (at least 90%) small packets (<200 bytes) |

A third rule shown in Table 4 defines the policy to be used to handle a VOIP (digital voice) call.

TABLE 4

| Parameter | Value | Explanation |
| --- | --- | --- |
| Name | VoiceCall | Provides the name for this rule. |
| description | "Traffic that is characteristic of a voice-only call (or conference call) should be given wireless connectivity for low latency except when usage has been high. The first step down is to run just the downstream traffic is over satellite. With very high wireless usage both set of traffic should be carried satellite." | Describes the type of traffic the rule is carrying and the desired policy for that kind of traffic. |
| Score | 200000 | A relatively high score so that other rule matches will not take precedence should they occur. |
| knobrange | 1~6 | Use this rule regardless of knob setting. |
| upcontractid | preferWireless, prefer Wireless, preferWireless, prefer Wireless, preferWireless, preferSatellite | The policy is to use the use wireless except for the highest usage knob setting (knob level 6) |
| dncontractid | preferWireless, prefer Wireless, preferSatellite | The policy is to use the wireless when wireless usage has been consistently low (usage knob levels 1 and 2) and to use satellite otherwise to conserve the more expensive wireless usage. |
| multiperiodmatch | 2~3 | The rule matches when 2 of the last 3 measurement periods matched. |
| upthruputrange | 60~140 | Match on moderately low upstream thruput |
| dnthruputrange | 60~120 | Match on moderately low to moderate downstream thruput. |
| dnppsrange | 40~70 | Match when 40 to 70 packets per second are being processed. |
| upppsrange | 40~70 | Match when 40 to 70 packets per second are being processed. |
| dnpercsmallinter arrivalpackets range | 95~100 | Match when the vast majority of packets have small interarrival times. |
| uppercsmallinter arrivalpackets range | 95~100 | Match when the vast majority of packets have small interarrival times. |
| dnmaxinter packetmsrange | 15~220 | Match when the maximum inter-arrival time is between 15 and 220 ms. |
| upmaxinter packetmsrange | 15~220 | Match when the maximum inter-arrival time is between 15 and 220 ms. |
| Dnpercentsmall pktrange | 92~100 | Match when most packets are small (<200 bytes). |
| Uppercentsmall pktrange | 92~100 | Match when most packets are small (<200 bytes). |

A fourth example rule shown in Table 5 covers a conference call with downstream video higher-speed conference call with downstream video. This rule allows for more non-match samples. This rule may take around 10 seconds after the start of a call for the rule to become active and around 15 seconds after a call for it to end.

Other rules may be utilized beyond the above examples to cover the various traffic types, including for example, the other traffic types discussed above. The rules may be empirically arrived at by examining the characteristics of the traffic and selecting a set of match criteria peculiar to that traffic.

TABLE 5

| Parameter | Value | Explanation |
| --- | --- | --- |
| Name | Dn VideoConfCall | Provides the name for this rule. |
| description | "Traffic that is characteristic of a downstream video conference call with upstream voice traffic. This type of traffic should be given wireless connectivity for low latency except when usage has been high. The first step down is to run just the downstream traffic is over satellite. With very high wireless usage both set of traffic should be carried satellite." | Describes the type of traffic the rule is carrying and the desired policy for that kind of traffic. |
| Score | 180000 | A moderately high score so that other rule matches may or may not (depending on their score) take precedence should the match. |
| knobrange | 1~6 | Use this rule regardless of knob setting. |
| upcontractid | prefer Wireless, prefer Wireless, preferWireless, preferWireless, preferWireless, preferSatellite | The policy is to use the use wireless except for the highest usage knob setting (knob level 6) |
| dncontractid | preferWireless, preferSatellite | The policy is to use the wireless when wireless usage has been consistently very low (usage knob levels 1) to minimize latency and to use satellite otherwise to conserve the more expensive wireless usage. |
| multiperiodmatch | 3~5 | The rule matches when 3 of the last 5 measurement periods matched. |
| upthruputrange | 60~650 | Match on moderately low upstream thruput but allow higher speeds as this has been empirically seen to occur. |
| dnthruputrange | 200~500 | Match on moderate downstream thruput. |
| dnppsrange | 40~90 | Match when 40 to 90 packets per second are being processed. |
| upppsrange | 40~90 | Match when 40 to 90 packets per second are being processed. |
| dnpercsmallinterarrivalpacketsrange | 95~100 | Match when the vast majority of packets have small interarrival times. |
| uppercsmallinterarrivalpacketsrange | 80~100 | Match when the clear majority of packets have small interarrival times. |
| dnmaxinterpacketmsrange | 40~220 | Match when the maximum inter-arrival time is between 15 and 220 ms. |
| upmaxinterpacketmsrange | 40~500 | Match when the maximum inter-arrival time is between 15 and 220 ms. |
| dnpercentsmallpktrange | 60~100 | Match when most packets are small (<200 bytes) but allow for large packets carrying video. |
| uppercentsmallpktrange | 80~100 | Match when most packets are small (<200 bytes). |

Usage Knob

The usage knob (FIG. 2, 230, FIG. 3, 324) identifies how much LTE usage is to be reduced. The usage knob at any given time has a specific value that is referred to as its usage knob setting. The usage knob setting in a preferred embodiment govern LTE usage across a broad range of applications including web browsing, VOIP and video conference, but is, with the present invention, used to specifically govern a VPN connection's LTE usage.

In the preferred embodiment the usage knob setting is based on the usage during the current and previous billing periods, where the usage knob setting increases based on any of a number of criteria including the following.

Wireless usage billing period to date compared to a billing period limit.

Wireless usage billing period to date as a function of a billing period limit and how much of the billing period has already taken place.

Wireless usage billing period to date where the start of billing period usage is a function of how much usage occurred in the previous billing period.

Many other such variations are possible in other embodiments but with the general principle that as the usage knob setting increases the level of LTE usage reduction should also increase.

VPN Classifier Policy Determination

The VPN Classifier, in the preferred embodiment, updates an outbound VPN IP flow's policy once every measurement period. The update is based on the current and recent measurement period measurements and only the Usage Knob setting.

Candidate VPN Classification Rule Computation

Typically, Usage Knob setting changes occurs infrequently. In the preferred embodiment, the VPN Classifier determines a candidate list of rules from the configured list of rules at startup and when the Usage Knob setting changes and when the configured list of rules change. The Candidate list of rules is the subset of configured rules which include the following. A knobrange which includes the current usage knob setting. Have a performance contract ID the current usage knob setting usable by the VPN's Classifier network element (upcontractid for the SD-WAN Router and dncontractid for the SD-WAN Gateway).

High-Scoring VPN Classification Rule Determination

In the preferred embodiment, at the end of each measurement period, the VPN Classifier updates the status of each candidate rule. It determines whether the period's measurements match the rule apart from the rule's multiperiodmatch parameter. With that determination it updates the rule's multiperiod long history (based on the N most recent periods) and determines whether the rule matches. The VPN Classifier then assigns the IP flow the SD-WAN selection policy of the highest-scoring rule whose status is "rule matches". That policy is the highest scoring rule's contract ID for the current Usage Knob setting. The rules are organized with a default rule that will always match but with very low score and thus the VPN classifier will always have a highest scoring rule and thus be able to determine the current policy.

Per-Packet Policy Assignment

In the preferred embodiment, the VPN classifier, in addition to processing an outbound VPN packet to update its VPN Connection's statistics, tags the packet with its SD-WAN policy. It looks up its outbound IP flow and tags the packet with that flow's policy as determined at the end of the previous measurement period.

Figure 9:
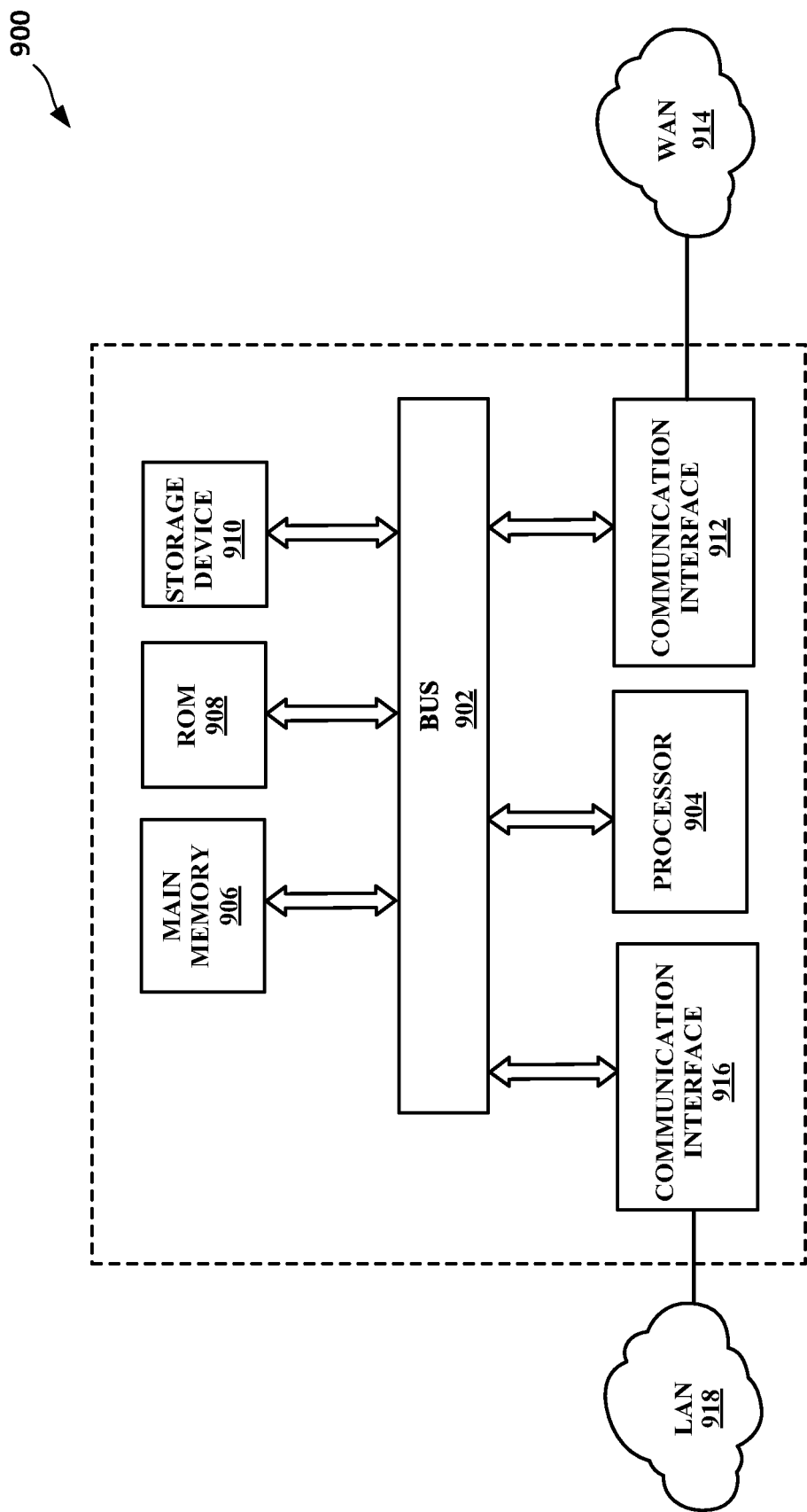
FIG. 9 illustrates a block diagram showing an example of router hardware upon which aspects of this disclosure may be implemented.

FIG. 9 is a block diagram showing an example of router hardware 900 upon which aspects of this disclosure may be implemented. It will be understood that functional blocks illustrated in FIG. 9 are logical blocks of a hardware router such as a CPE router described in the functional block diagram of FIG. 2, and do not necessarily correspond to particular hardware. The router 900 may include a bus 902 or other communication mechanism for communicating information, and a processor 904 coupled with the bus 902 for processing information. The router 900 may also include a main memory 906, such as a random-access memory (RAM) or other dynamic storage device, coupled to the bus 902 for storing information and executable instructions to be executed by the processor 904. The executable instructions can include instruction that, when executed by the processor 904, cause the processor to perform operations in accordance with the flow diagrams and functionality described above. The main memory 906 may also be used for storing temporary variables or other intermediate information during execution of instructions to be executed by the processor 904.

The router 900 may further include a read only memory (ROM) 908 or other static storage device coupled to the bus 902 for storing static information and instructions for the processor 904. A storage device 910, such as a flash or other non-volatile memory may be coupled to the bus 902 for storing information and instructions. The router 900 may also include a communication interface 912 coupled to a bus for two-way data communication coupling to a WAN 914 to provide data communication through one or more networks to other data devices. The router 900 may also include another communication interface 916 coupled to a bus for two-way data communication coupling to a LAN 918 to provide data communication through the LAN to other data devices such as LAN remote host 120 shown in FIG. 1.

Figure 10:
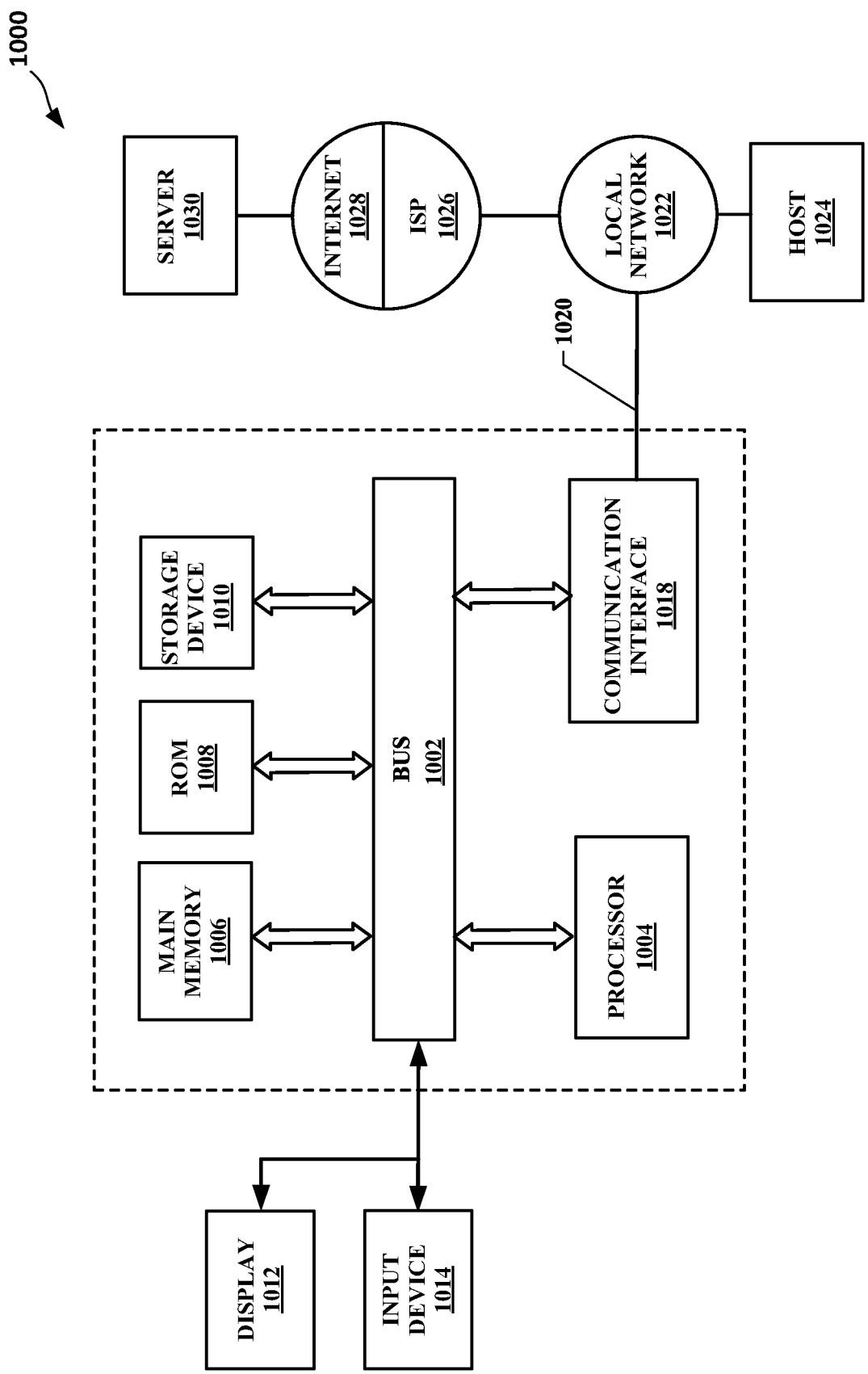
FIG. 10 illustrates a block diagram showing an example computer system upon which aspects of this disclosure may be implemented.

FIG. 10 is a block diagram showing an example a computer system 1000 upon which aspects of this disclosure may be implemented. It will be understood that functional blocks illustrated in FIG. 9 are logical blocks, and do not necessarily correspond to particular hardware.

The computer system 1000 may include a bus 1002 or other communication mechanism for communicating information, and a processor 1004 coupled with the bus 1002 for processing information. The computer system 1000 may also include a main memory 1006, such as a random-access memory (RAM) or other dynamic storage device, coupled to the bus 1002 for storing information and executable instructions to be executed by the processor 1004. The executable instructions can include instruction that, when executed by the processor 1004, cause the processor to perform operations in accordance with the flow diagram of FIG. 8. The main memory 1006 may also be used for storing temporary variables or other intermediate information during execution of instructions to be executed by the processor 1004. The computer system 1000 may implement, for example, UT, SRAN, AMF, UPF, etc.

The computer system 1000 may further include a read only memory (ROM) 1008 or other static storage device coupled to the bus 1002 for storing static information and instructions for the processor 1004. A storage device 1010, such as a flash or other non-volatile memory may be coupled to the bus 1002 for storing information and instructions.

The computer system 1000 may be coupled via the bus 1002 to a display 1012, such as a liquid crystal display (LCD), for displaying information. One or more user input devices, such as the example user input device 1014 may be coupled to the bus 1002, and may be configured for receiving various user inputs, such as user command selections and communicating these to the processor 1004, or to the main memory 1006. The user input device 1014 may include physical structure, or virtual implementation, or both, providing user input modes or options, for controlling, for example, a cursor, visible to a user through display 1012 or through other techniques, and such modes or operations may include, for example virtual mouse, trackball, or cursor direction keys.

The computer system 1000 may include respective resources of the processor 1004 executing, in an overlapping or interleaved manner, respective program instructions. Instructions may be read into the main memory 1006 from another machine-readable medium, such as the storage device 1010. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1010. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1000 may also include a communication interface 1018 coupled to the bus 1002, for two-way data communication coupling to a network link 1020 connected to a local network 1022. The network link 1020 may provide data communication through one or more networks to other data devices. For example, the network link 1020 may provide a connection through the local network 1022 to a host computer 1024 or to data equipment operated by an Internet Service Provider (ISP) 1026 to access through the Internet 1028 a server 1030, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A software defined wide area network (SD-WAN) gateway that supports operation of one or more SD-WAN routers comprising:
    a classifier that examines encrypted packets of a virtual private network (VPN) connection in which the packets are to be carried by SD-WAN tunnels, estimates a traffic type of the packets of the VPN connection, and sets a tunnel selection policy based at least partly on the traffic type for which tunnel of a first SD-WAN tunnel and second SD-WAN tunnel the packets of the VPN connection should be carried by; wherein:
    the VPN classifier uses recent measurements of packets of the VPN connection to estimate the traffic type based on a distribution of packets size for packets transferred; and
    the SD-WAN gateway sends packets of data based on the tunnel selection policy on the first SD-WAN tunnel or the second SD-WAN tunnel.

2. The SD-WAN gateway of claim 1, wherein the VPN classifier determines the distribution of packets in packet size ranges by counting sizes of upstream packets and downstream packets in a measurement period.

3. The SD-WAN gateway of claim 1, wherein the tunnel selection policy depends on an amount of higher-cost WAN connection carried historically.

4. The SD-WAN gateway of claim 1, wherein the recent measurements are on-going measurements taken periodically.

5. The SD-WAN gateway of claim 1, wherein the tunnel selection policy is determined using factors based on VPN connection upstream and downstream packet size and measurements of upstream and downstream packets.

6. The SD-WAN gateway of claim 5, wherein the factors include maximum packet inter-arrival time within a measurement period.

7. The SD-WAN gateway of claim 5, wherein the factors include a fraction of downstream traffic.

8. The SD-WAN gateway of claim 5, wherein the factors include a knob range of a usage knob, wherein the usage knob represents an urgency for reducing usage of the second SD-WAN tunnel, and wherein the second SD-WAN tunnel has a higher-cost per GB and lower-latency compared to the first SD-WAN tunnel.

9. The SD-WAN gateway of claim 1, wherein VPN classifier receives a set of VPN classification rules that are used to estimate traffic type.

10. The SD-WAN gateway of claim 1, wherein a classification rule includes an acceptable thruput bitrate in kilobits per second for a given measurement period.

11. A software defined wide area network (SD-WAN) gateway that supports operation of one or more SD-WAN routers comprising:
a classifier that examines encrypted packets of a virtual private network (VPN) connection, in which the packets are to be carried by SD-WAN tunnels, estimates a traffic type of the packets of the VPN connection and sets a tunnel selection policy based at least partly on the traffic type for which tunnel of a first SD-WAN tunnel and second SD-WAN tunnel the packets of the VPN connection should be carried by; wherein:
the VPN classifier uses recent measurements of packets of the VPN connection to estimate the traffic type based on a distribution of packets size ranges for packets transferred upstream and downstream;
the SD-WAN gateway sends packets of data based on the tunnel selection policy on the first SD-WAN tunnel or the second SD-WAN tunnel; and wherein:
the tunnel selection policy is determined using factors based on VPN connection upstream and downstream packet size and measurements of upstream and downstream packets;
the factors include a knob range of a usage knob, wherein the usage knob represents an urgency for reducing usage of the second SD-WAN tunnel;
the second SD-WAN tunnel has a higher-cost per GB and lower-latency compared to the first WAN connection; and
the factors include maximum packet inter-arrival time within a measurement period.

12. A method for assigning VPN network flow on a software defined wide area network (SD-WAN) gateway comprising:
monitoring an encrypted VPN flow for a specified period of time;
calculating traffic statistics of the VPN flow in the specified period of time;
applying classification rules to the traffic statistics wherein the classification rules estimate a traffic type in the VPN flow based on a distribution of packet size ranges for packets transferred upstream and downstream;
determining a tunnel selection policy based on matched classification rules with a highest score, wherein the tunnel selection policy depends on distribution of packets in packet size ranges for packets transferred upstream and downstream; and
assigning VPN flow to a WAN interface based on the traffic type and the tunnel selection policy.

13. The method of claim 12 wherein the tunnel selection policy is determined using factors based on VPN connection upstream and downstream packet size and measurements of upstream and downstream packets, including determining distribution of packets in packet size ranges by counting sizes of upstream packets and downstream packets in a measurement period.

14. The method of claim 12, wherein the tunnel selection policy depends on an amount of higher-cost WAN connection carried historically.

15. The method of claim 12 wherein the calculated traffic statistics are taken when a specified number of bytes or packets have been accumulated.

16. The method of claim 12, wherein the classification rules include a maximum packet inter-arrival time within a measurement period.

17. The method of claim 12, wherein the classification rules include a fraction of downstream traffic.

18. The method of claim 12, wherein the classification rules include a setting of a usage knob, where the usage knob is a representative of an urgency for reducing usage of a WAN connection with a higher-cost per GB and lower-latency.

19. The method of claim 12, wherein VPN classifier receives a set of VPN classification rules that are used to estimate traffic type.

20. The method of claim 19 wherein a classification rule includes an acceptable thruput bitrate in kilobits per second for a given measurement period.

* * * * *